(12) United States Patent  (10) Patent No.: US 7,395,314 B2
Smith et al.  (45) Date of Patent: Jul. 1, 2008

(54) SYSTEMS AND METHODS FOR GOVERNING THE PERFORMANCE OF HIGH VOLUME ELECTRONIC MAIL DELIVERY

(75) Inventors: Steven J. Smith, San Francisco, CA (US); Kenneth A. Schmidt, San Francisco, CA (US)

(73) Assignee: Mindshare Design, Inc., San Francisco, CA (US)

(*) Notice: Subject to any disclaimer, the term of this patent is extended or adjusted under 35 U.S.C. 154(b) by 883 days.

(21) Appl. No.: 10/695,228

(22) Filed: Oct. 28, 2003

(65) Prior Publication Data

US 2005/0091323 A1  Apr. 28, 2005

(51) Int. Cl.
*G06F 15/16* (2006.01)

(52) U.S. Cl. .................... 709/206; 709/219

(58) Field of Classification Search .......... 709/204–207
See application file for complete search history.

(56) References Cited

U.S. PATENT DOCUMENTS

| | | | |
|---|---|---|---|
| 4,723,212 A | 2/1988 | Mindrum et al. | |
| 5,377,354 A | 12/1994 | Scannell et al. | |
| 5,424,724 A | 6/1995 | Williams et al. | |
| 5,487,100 A | 1/1996 | Kane | |
| 5,502,636 A | 3/1996 | Clarke | |
| 5,504,897 A | 4/1996 | Gans et al. | |
| 5,619,648 A | 4/1997 | Canale et al. | |
| 5,740,549 A | 4/1998 | Reilly et al. | |
| 5,761,662 A | 6/1998 | Dasan | |
| 5,793,497 A | 8/1998 | Funk | |
| 5,793,972 A | 8/1998 | Shane | |
| 5,835,762 A | 11/1998 | Gans et al. | |
| 5,862,325 A | 1/1999 | Reed et al. | |
| 5,864,684 A | 1/1999 | Nielsen | |
| 5,893,099 A | 4/1999 | Schreiber et al. | |
| 5,903,723 A | 5/1999 | Beck et al. | |
| 5,919,247 A | 7/1999 | Van Hoff et al. | |
| 5,930,479 A | 7/1999 | Hall | |
| 5,937,162 A | 8/1999 | Funk et al. | |
| 5,944,787 A | 8/1999 | Zoken | |
| 5,948,061 A | 9/1999 | Merriman et al. | |
| 5,970,469 A | 10/1999 | Scroggie et al. | |
| 5,990,886 A | 11/1999 | Serdy et al. | |
| 5,999,932 A | 12/1999 | Paul | |
| 5,999,967 A | 12/1999 | Sundsted | |
| 6,014,634 A | 1/2000 | Scroggie et al. | |
| 6,023,723 A | 2/2000 | McCormick et al. | |

(Continued)

OTHER PUBLICATIONS

Article—"FloNetwork Inc., Prefer Network Team Up," www.emailuniverse.com/list-news/2000/10/18.html, Oct. 18, 2000, 1 page.

(Continued)

*Primary Examiner*—Yves Dalencourt
*Assistant Examiner*—Michael C Lai
(74) *Attorney, Agent, or Firm*—Fliesler Meyer LLP

(57) ABSTRACT

A system and method for governing the delivery rate of electronic mail (email) messages, said method comprising providing for the delivery of email messages, controlling the rate of the delivery based on delivery efficiency and a target delivery rate, and wherein the delivery efficiency is based on the performance of a plurality of mail transfer agents (MTAs) that are capable of delivering email simultaneously.

38 Claims, 13 Drawing Sheets

U.S. PATENT DOCUMENTS

| | | | |
|---|---|---|---|
| 6,038,668 | A | 3/2000 | Chipman et al. |
| 6,044,205 | A | 3/2000 | Reed et al. |
| 6,044,395 | A | 3/2000 | Costales et al. |
| 6,052,709 | A | 4/2000 | Paul |
| 6,072,942 | A | 6/2000 | Stockwell et al. |
| 6,112,227 | A | 8/2000 | Heiner |
| 6,138,162 | A | 10/2000 | Pistriotto et al. |
| 6,161,130 | A | 12/2000 | Horvitz et al. |
| 6,167,435 | A | 12/2000 | Druckenmiller et al. |
| 6,173,311 | B1 | 1/2001 | Hassett et al. |
| 6,185,541 | B1 | 2/2001 | Scroggie et al. |
| 6,195,698 | B1 | 2/2001 | Lillibridge et al. |
| 6,199,102 | B1 | 3/2001 | Cobb |
| 6,216,127 | B1 * | 4/2001 | Gans et al. .................... 707/10 |
| 6,226,684 | B1 | 5/2001 | Sung et al. |
| 6,249,805 | B1 | 6/2001 | Fleming, III |
| 6,266,692 | B1 | 7/2001 | Greenstein |
| 6,272,536 | B1 | 8/2001 | Van Hoff et al. |
| 6,289,372 | B1 | 9/2001 | Vyaznikov |
| 6,341,316 | B1 | 1/2002 | Kloba et al. |
| 6,353,852 | B1 | 3/2002 | Nestoriak et al. |
| 6,367,075 | B1 | 4/2002 | Kruger |
| 6,377,936 | B1 | 4/2002 | Henrick et al. |
| 6,381,631 | B1 | 4/2002 | Van Hoff |
| 6,393,464 | B1 | 5/2002 | Dieterman |
| 6,421,709 | B1 | 7/2002 | McCormick et al. |
| 6,421,717 | B1 | 7/2002 | Kloba et al. |
| 6,430,608 | B1 | 8/2002 | Shaio |
| 6,463,462 | B1 | 10/2002 | Smith et al. |
| 6,546,416 | B1 | 4/2003 | Kirsch |
| 6,553,412 | B1 | 4/2003 | Kloba et al. |
| 6,671,715 | B1 * | 12/2003 | Langseth et al. ............ 709/203 |
| 2001/0051979 | A1 | 12/2001 | Aufricht et al. |
| 2002/0023135 | A1 | 2/2002 | Shuster |
| 2002/0032722 | A1 | 3/2002 | Baynes et al. |
| 2002/0052781 | A1 | 5/2002 | Aufricht et al. |
| 2002/0116463 | A1 | 8/2002 | Hart |
| 2002/0120496 | A1 | 8/2002 | Scroggie et al. |
| 2002/0143879 | A1 | 10/2002 | Sommerer |
| 2002/0152245 | A1 | 10/2002 | McCaskey et al. |
| 2002/0152272 | A1 | 10/2002 | Yairi |
| 2002/0199095 | A1 | 12/2002 | Bandini et al. |
| 2003/0014414 | A1 | 1/2003 | Newman |
| 2003/0028580 | A1 | 2/2003 | Kucherawy |
| 2004/0205124 | A1 * | 10/2004 | Limprecht et al. .......... 709/204 |

OTHER PUBLICATIONS

Press Release—"Responsys.com Introduces Responsys Interact 2.0 for Permission-Based Direction on the Internet," www.responsys.com/corporate/about/details_press.asp?id=10, dated Monday, Oct. 25, 1999, 3 pages.

Press Release—"L-Soft Announces Release of LSMTP™ Version 1.1b," www.1soft.com/news/lsmtp, dated Mar. 1, 1999, 2 pages.

Internet Article—"Eight Great Lists Call Topica Home," *The Leader in Email Discussions & Publishing Solutions*, www.topica.com/about/index.html?mode=eight, dated Jul. 26, 1999, 3 pages.

Chapman, D. B., "Majordomo: How I Manage 17 Mailing Lists Without Answering "request" Mail," *1992 LISA VI*, Oct. 19-23, 1992—Long Beach, CA, pp. 135-143.

* cited by examiner

SYSTEMS AND METHODS FOR GOVERNING THE PERFORMANCE OF HIGH VOLUME ELECTRONIC MAIL DELIVERY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application is related to the following co-pending applications which are each hereby incorporated by reference in their entirety:

HIGH VOLUME ELECTRONIC MAIL PROCESSING SYSTEMS AND METHODS, U.S. application Ser. No. 09/829,524, Inventor: Steven J. Smith, filed on Apr. 9, 2001.

HIGH VOLUME ELECTRONIC MAIL PROCESSING SYSTEMS AND METHODS HAVING REMOTE TRANSMISSION CAPABILITY, U.S. application Ser. No. 10/389,419, Inventor: Steven J. Smith et al., filed on Mar. 14, 2003.

SYSTEMS AND METHODS FOR MONITORING EVENTS ASSOCIATED WITH TRANSMITTED ELECTRONIC MAIL MESSAGES, U.S. APPLICATION No. 10/171,720, Inventor: Steven J. Smith, et al., filed on Jun. 14, 2002.

FIELD OF THE DISCLOSURE

The present disclosure relates generally to the systems and methods for processing and transmitting high volume email messages.

BACKGROUND

The rapid growth and popularity of electronic mail (email) has also resulted in new uses for this form of communication. While originally email was primarily used for communicating between individuals or between corporations and their customers, it has now been adopted by other entities which have historically used more conventional modes of communication. For example, news sources and other entities which must communicate with extremely large numbers of people are now utilizing email as a means of communication and transferring data.

Conventional email distribution systems can encounter problems related to performance when attempting to send bulk quantities of email. Some systems may achieve their maximum attainable throughput while others may not. An email system's operating environment can play a part in determining the its performance. For example, connection times to other email systems may be slow, communication links between hops can be error prone, etc. What is needed is an email distribution system that can automatically react to environmental conditions to achieve the best attainable throughput.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
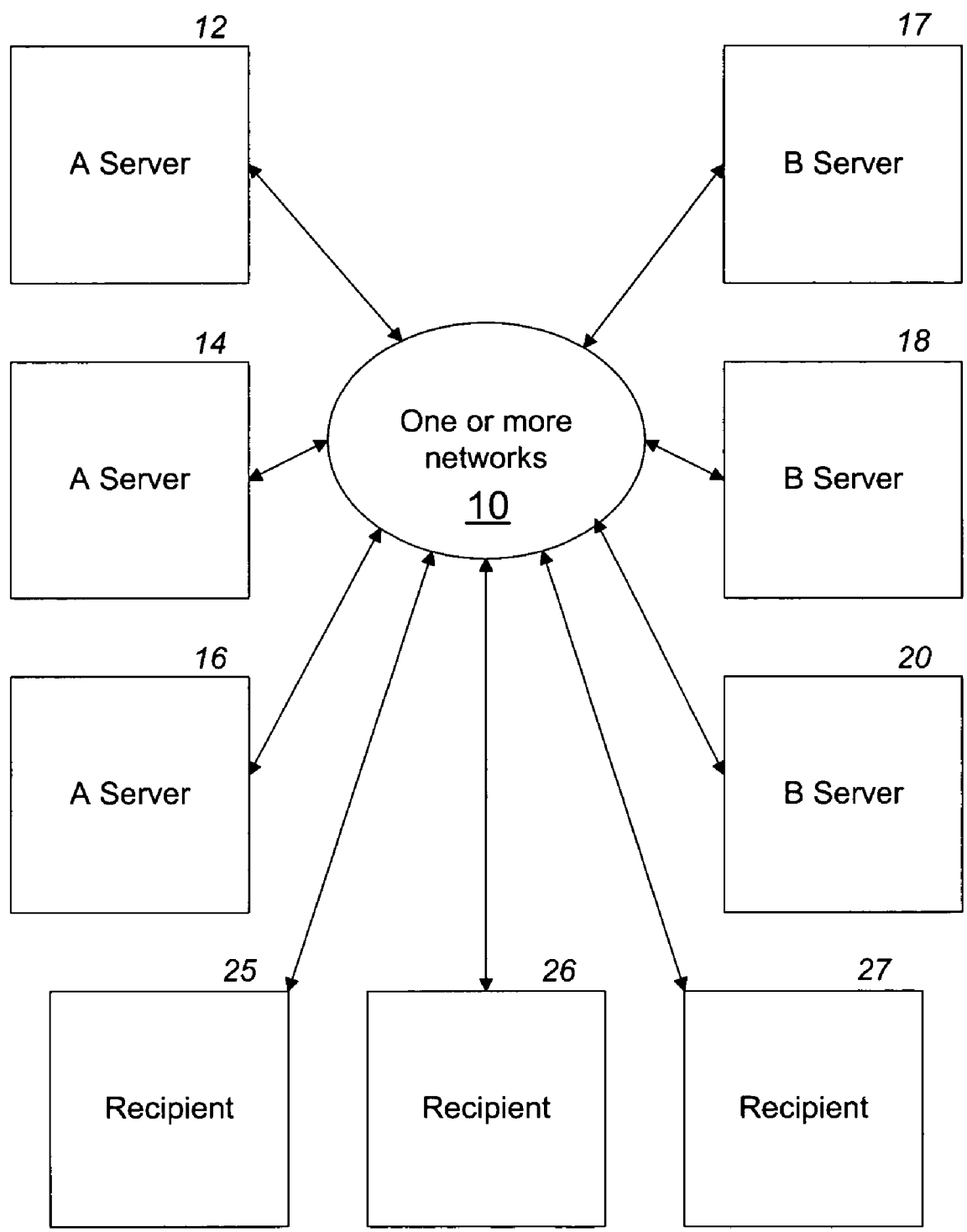
FIG. 1 is an illustration of an embodiment of the invention.

FIG. 1 is an illustration of an embodiment of the present invention. Although this diagram depicts objects/processes as logically separate, such depiction is merely for illustrative purposes. It will be apparent to those skilled in the art that the objects/processes portrayed in this figure can be arbitrarily combined or divided into separate software, firmware and/or hardware components. Furthermore, it will also be apparent to those skilled in the art that such objects/processes, regardless of how they are combined or divided, can execute on the same computing device or can be distributed among different computing devices connected by one or more networks.

A first group of one or more servers referred to as the "A" servers 12, 14 and 16 can communicate using one or more networks 10 (e.g., public networks, private networks, wired networks, wireless networks, the Internet, satellite, and other suitable networks) with a second group of one or more servers (the "B" servers). The A servers can provide storage for email distribution lists. These servers can also include software which can be used in the manipulation and processing of messages for transmission to email recipients 25, 26, 27 identified on the email distribution lists. In one embodiment, the email distribution list information could be accessible to an A server through one or more networks. By way of a non-limiting example, the software on an A server could be capable of generating reports and controlling actual email delivery. In one embodiment, B servers 17, 18 and 20 can be under the control of the A servers and can perform mass delivery of email messages to the email recipients included on the email distribution list(s). In another embodiment, the B server functionality could be incorporated into one or more A server(s).

The embodiments set forth herein are exemplary and many other variations as will be apparent to those of skill in the art are within the scope and spirit of this disclosure. By way of a non-limiting example, in one embodiment a single A server can be utilized in conjunction with a single B server. In yet another embodiment, processes that execute on one or more A and/or B servers can be implemented as one or more threads of execution such that all threads could execute on one or more computing devices connected by one or more networks, shared memory or other suitable communication medium(s).

Figure 2:
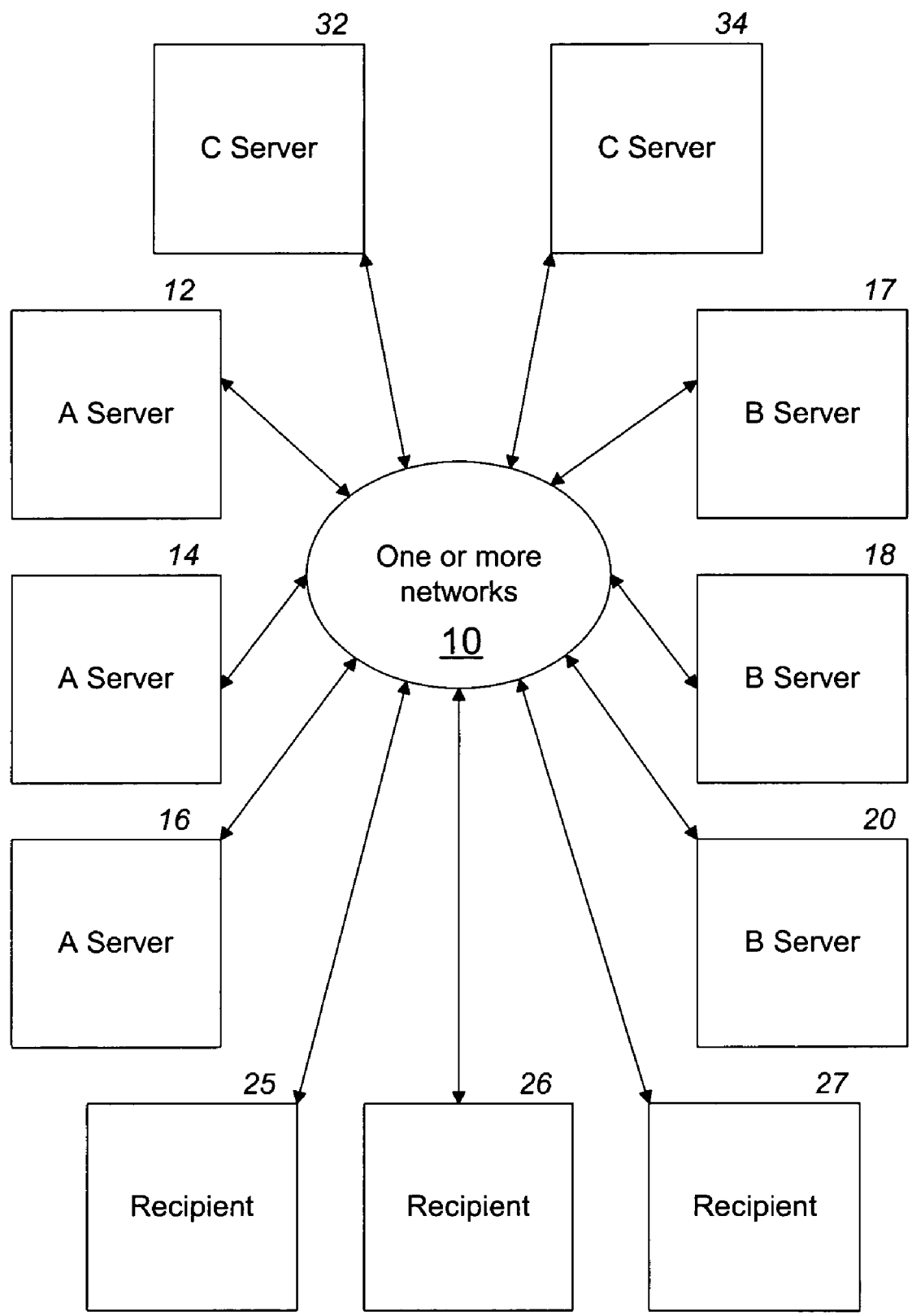
FIG. 2 is an illustration including separate bounce message servers in an embodiment of the invention.

FIG. 2 is an illustration including separate bounce message servers in an embodiment of the invention. Although this diagram depicts objects/processes as logically separate, such depiction is merely for illustrative purposes. It will be apparent to those skilled in the art that the objects/processes portrayed in this figure can be arbitrarily combined or divided into separate software, firmware and/or hardware components. Furthermore, it will also be apparent to those skilled in the art that such objects/processes, regardless of how they are combined or divided, can execute on the same computing device or can be distributed among different computing devices connected by one or more networks.

Another group of one or more servers known as the "C" servers 32 and 34 are depicted. C servers can be used to collect bounced email messages and to provide this information to A servers. In one embodiment of the system, verification of processing can be performed at intermediate stages of the message transmission in order to ensure complete recoverability from any stoppage in processing of email delivery by either the A or B servers. In another embodiment, the C server functionality can be incorporated into one or more of the A server(s) and/or the B server(s).

Regardless of whether the servers/server processes are located at a user's location, in one embodiment the user can control and schedule email transmission via a graphical user interface (GUI) (not shown). By way of a non-limiting example, such a GUI could be provided by a web browser or other suitable user interface. In another embodiment, the system can be controlled through any combination of GUI, voice commands, gestures, sounds, remote control, and other suitable user input means. In another embodiment, user input is not required for the system to function. In this case, the system could respond automatically to requests or directives provided to it by other systems or through some internal scheduling mechanism.

Based on user or other input, an email message for delivery can be provided to the system in a pending message queue file or other persistent mechanism. The message can be stored on an A server or in another storage location accessible by an A server or other server. The same is also true of the email distribution list. Delivery of an email message can be immediate or scheduled for a future time. This portion of the system operation can be performed via the A servers, however, those skilled in the art will appreciate that yet additional servers could be utilized for providing a GUI for scheduling the delivery of messages. The scheduling information need only be accessible to the A server or servers through which the message will be transmitted.

An A server can review a pending message queue periodically to identify messages to be sent by the system. If the system identifies a message in the pending message queue which is to be sent, a sender process can be initiated for that message. In one embodiment, the sender process can be performed by an A server. In one embodiment, the sender process first checks to see if it has been performed to some extent previously in order to avoid repetition of any steps which could result in duplicate or skipped deliveries.

If the process has been run before, it can skip to the point in time at which it left off previously. In one embodiment, this can be accomplished through the use of process completion checkpoints (discussed below). If the system determines that this is the initial processing of the particular email message, however, message delivery can commence by partitioning the email distribution list into distribution list subsets. It should be recognized that the system could also maintain the email distribution list subsets stored in a memory or other storage accessible to A server(s). The system can also create cross-reference files for mail merge. Once the distribution list subsets have been created, the system can determine the number of mail transfer agents (MTAs) required based on a target delivery time and/or a total number of recipients. An MTA is capable of delivering an email message (e.g., Sendmail). By way of a non-limiting example, an MTA can be include one or more application programs, processes, and/or threads of execution. In one embodiment, a single MTA can execute on one or more computing devices.

An MTA can deliver an email message to multiple recipients and/or perform mail merging tasks. In one embodiment, the system can monitor the concurrent parallel delivery progress of the MTAs. When the total number of MTAs and/or the corresponding allocation of resources has been determined, each of the distribution list subsets can be assigned to their respective B servers.

In one embodiment, this can be accomplished by identifying a set of available B servers. For each server in the set, the system checks to see if it has already allocated MTA(s) and started delivery through these servers. In one embodiment, this can be accomplished through the use of a checkpoint feature. If this has not occurred, the system can contact a B server to which the particular distribution list subset is assigned and attempt to reserve as many MTAs as possible. In one embodiment, remote delivery can be initiated by transferring the corresponding distribution lists, any cross reference files, email files, and the starting of the delivery processes. In one embodiment, a checkpoint can be persisted after each of the steps so that if there is a process interruption, the system will be able to be restarted without causing duplicate email messages or missed deliveries. In one embodiment, the checkpoint feature can be accomplished by persisting information that identifies completed processes or portions of processes so that redundant steps or transmissions can be avoided. This information can be made accessible to the A and/or B servers, or other servers/systems.

The various servers described above can be separate and physically located anywhere with access to the one or more networks. Thus, separate dedicated servers may be provided possibly at a customer location thereby providing customers with the ability to house their own database or A servers while using B and C processing servers located at a different physical location. This is desirable because the database servers which contain possibly proprietary information can be controlled more securely by a customer. Additionally, the customer is nevertheless able to make use of the high-volume, high performance network of B servers thereby eliminating the need for a significant internet connection at the customer location.

In one embodiment, once all of the necessary MTAs are allocated (or as they are allocated), the B servers can be periodically or continuously queried to verify delivery progress and to restart any MTA process that may have been interrupted. Progress can be verified by reviewing checkpoint information in order to ensure that progress is being made by each of the B servers. If an A server receives an indication from a B server that no progress is being made, it can send a request to the B server to restart email delivery at the location of the most recently completed checkpoint. In one embodiment, checkpoints may be identified as portion(s) of the distribution list or distribution list subset(s) that have been successfully transmitted by the B server. By way of a non-limiting example, if polling of the B server indicates that the same checkpoint has been returned as the most-recent process completion point, the system can then request that the process be restarted at the most-recently completed checkpoint.

In one embodiment, MTAs can be initiated on the B servers to deliver email messages. In one embodiment, the actual number of MTAs can be the number allocated by the sender process running on the A servers or other machine which has requested transmission by the B servers. MTAs can be personalize email messages with information contained in the mail merge cross-reference file. In one embodiment of the system, the distribution list subsets can be segmented into list portions that will each respectively contain certain similar content in order to streamline a mail merge process. By way of a non-limiting example, in a mailing for news information, users corresponding to addresses on the list who have requested to receive sports information will be separated into a corresponding distribution list subset.

In one embodiment, sender process(es) operating on the server(s) can run in parallel, periodically checking to make sure that MTAs on B servers are restarted if necessary in order to make sure that the complete delivery of all messages is achieved. In an alternate embodiment, when there is a failure of one or more of the B servers, the A server can dynamically reallocate the particular tasks assigned to the failed B server by determining if another B server is available. This may be done by making a general request for resources or alternatively, the A server may make a specific request to a particular B server that has already completed its tasks.

When it is confirmed that each of the remote delivery B servers have completed their sending responsibilities, the system can send a delivery summary to the requestor and the sender process operating on the A server completes. The process can be repeated for any other lists which have been set for delivery and for which the delivery initiation time has been reached.

Figure 3:
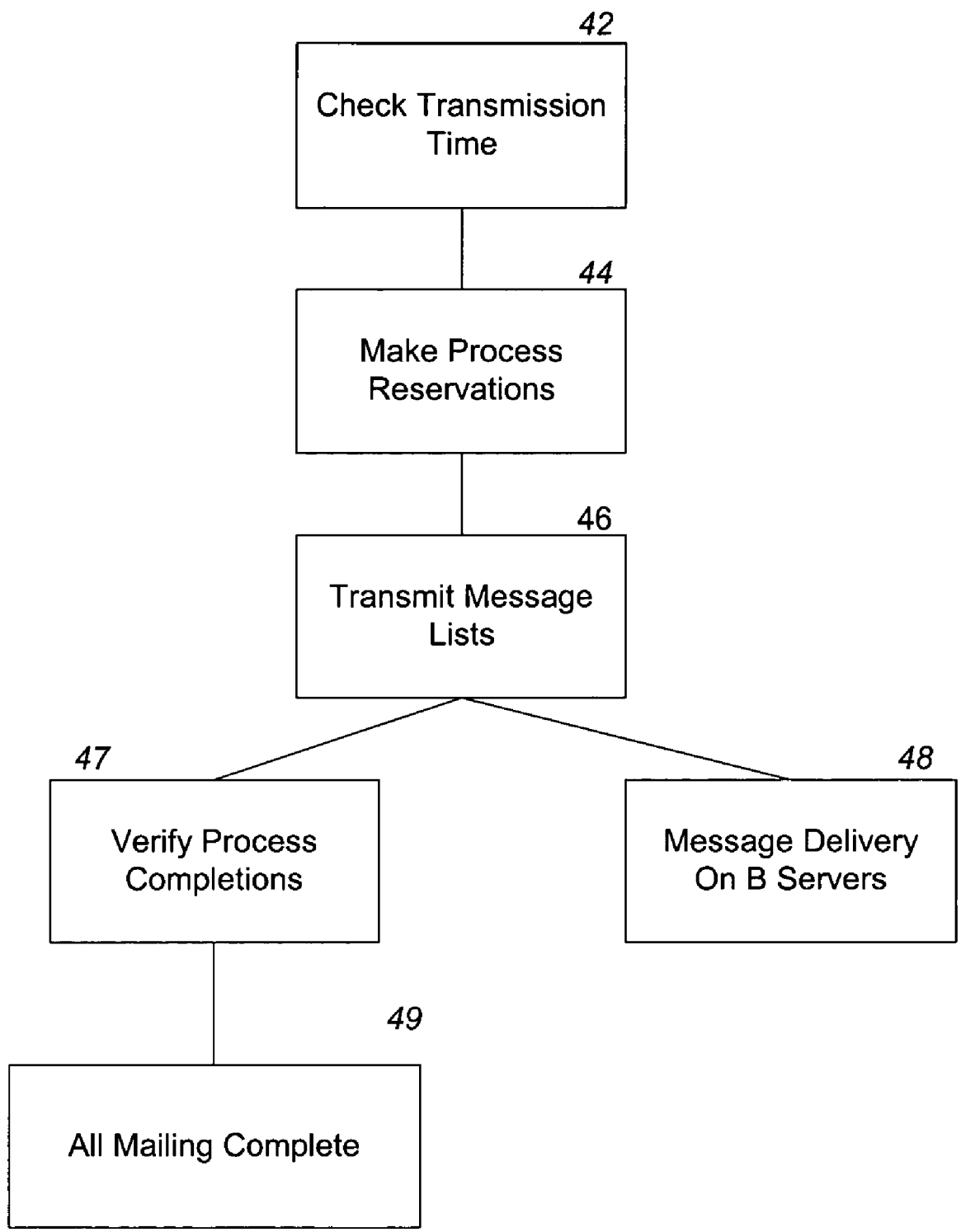
FIG. 3 is a flow diagram illustration of a sender process in one embodiment of the invention.

FIG. 3 is a flow diagram illustration of a sender process in one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

In step 42, the system determines if the time for initiating transmission of a message list has expired. In step 44, the system makes the appropriate MTA process reservations on any available B servers for transmission of the message to recipients. In step 46, distribution lists can be transmitted from the A server to one or more B servers on which MTA process reservations have been made. Thereafter, steps 47 and 48 can operate in parallel. Step 47 continues and verifies that the MTAs that have been initiated in step 48 are progressing. Step 48 indicates initiation of the MTA process(es) on the B server(s) which perform the actual transmission of the messages and/or mail merge. Step 49 verifies completion of mail transmission to all recipients on the main list.

In one embodiment, a separate computing device other than a server which contains the mailing list information could carry out the sender process. In such an embodiment, the device need only have access to the email distribution list information so that this separate machine can transmit the appropriate information to the B servers that will be utilized based on confirmation of the availability of these machines. In an alternate embodiment, it is contemplated that the machine controlling the B servers need only transmit email distribution list location information to each of the participating B servers so that they are able to access the necessary list information. By way of a non-limiting example, the distribution list information could be located at a secure web site of a customer. In yet another embodiment, the B servers can retain email distribution list information in order to avoid the need to acquire the list information from the A server or other machine. In such an alternate embodiment, the B server could acquire the appropriate list information in any of the ways identified above.

Figure 4:
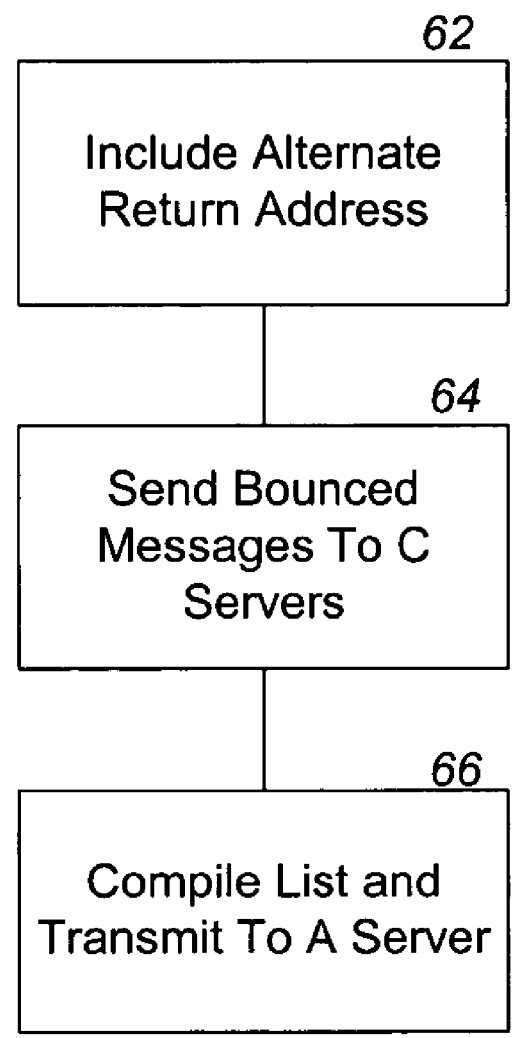
FIG. 4 is a flow diagram illustration of bounced message processing in one embodiment of the invention.

FIG. 4 is a flow diagram illustration of bounced message processing in one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

In one embodiment, transmitted email messages can include return address information for another server location other than the network address of the server transmitting the email message. The inclusion of this alternate return address location can occur in step 62. In step 64, return or bounced messages are sent to a designated C server. This decreases the load on the actual server performing the transmission of the mail message as the machine is not required to process any bounced or returned messages for which the transmission address was not valid.

In step 66, the C server compiles a list of destination addresses of returned email messages. In one embodiment, an A server can periodically requests this information. In an alternate embodiment, a C server can periodically transmit this information to the appropriate A server. The A server can then make any necessary modifications to the destination lists which are handled by the system. By way of a non-limiting example, message transmission that has been rejected after one or more designated attempts will result in purging of the address from the mailing list. Additionally, those messages for which a reply has been sent that includes the term "delete", "unsubscribe" or any other predesignated reference can also result in deletion of the address from the mailing list.

It will be recognized by those skilled in the art that although an embodiment of the invention described with reference to FIG. 2 indicates that a third group or class of servers known as the C servers is to be employed for the handling of bounced or returned mail, in alternate embodiments, either the B servers, the A servers or other system controlling machines could also be designated for return mail processing.

Figure 5:
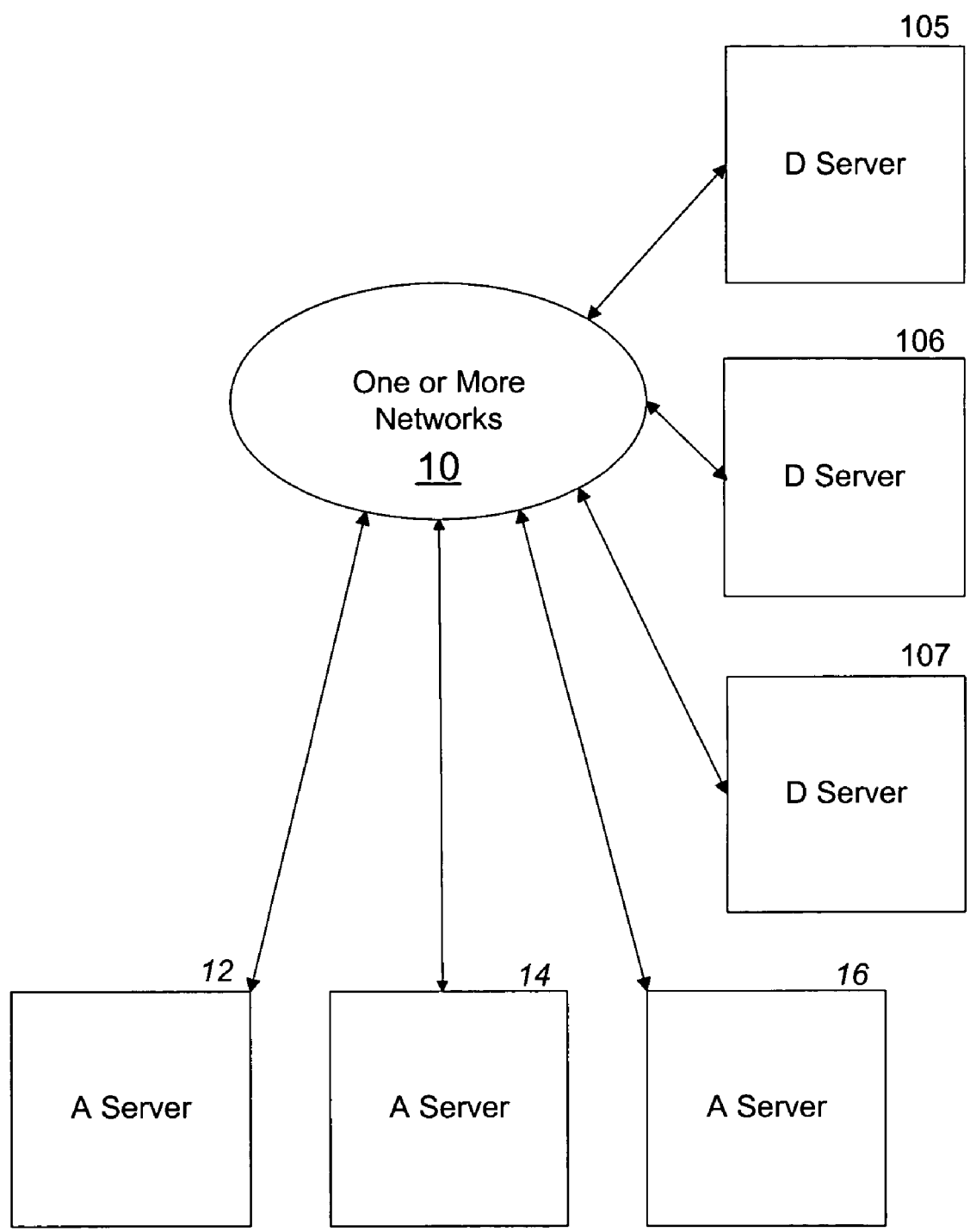
FIG. 5 is an illustration of separate inbound servers in one embodiment.

FIG. 5 is an illustration of separate inbound servers in one embodiment. Although this diagram depicts objects/processes as logically separate, such depiction is merely for illustrative purposes. It will be apparent to those skilled in the art that the objects/processes portrayed in this figure can be arbitrarily combined or divided into separate software, firmware and/or hardware components. Furthermore, it will also be apparent to those skilled in the art that such objects/processes, regardless of how they are combined or divided, can execute on the same computing device or can be distributed among different computing devices connected by one or more networks.

"D" servers 105, 106 and 107 can handle inbound requests to the system. By way of a non-limiting example, inbound requests can include such things as customer requests to add or delete recipients to/from an email distribution list. By way of a non-limiting example, a request can include an email message, a voice command, a command issued through a graphical or other user interface, a web-based request, and/or other suitable requests. The D servers can be configured to automatically send confirmation of received requests. In one embodiment, D servers can alter email distribution lists in response to requests. The use of the D servers enhances system efficiency by allowing inbound requests for changes in the lists to be initially handled by a separate group or class of servers. The use of the separate servers for performing this task allows inbound requests to be processed without interruption of any processes being performed on other servers.

In another embodiment, the D server functionality can be incorporated into one or more of the A server(s), B server(s), and/or C server(s).

Figure 6:
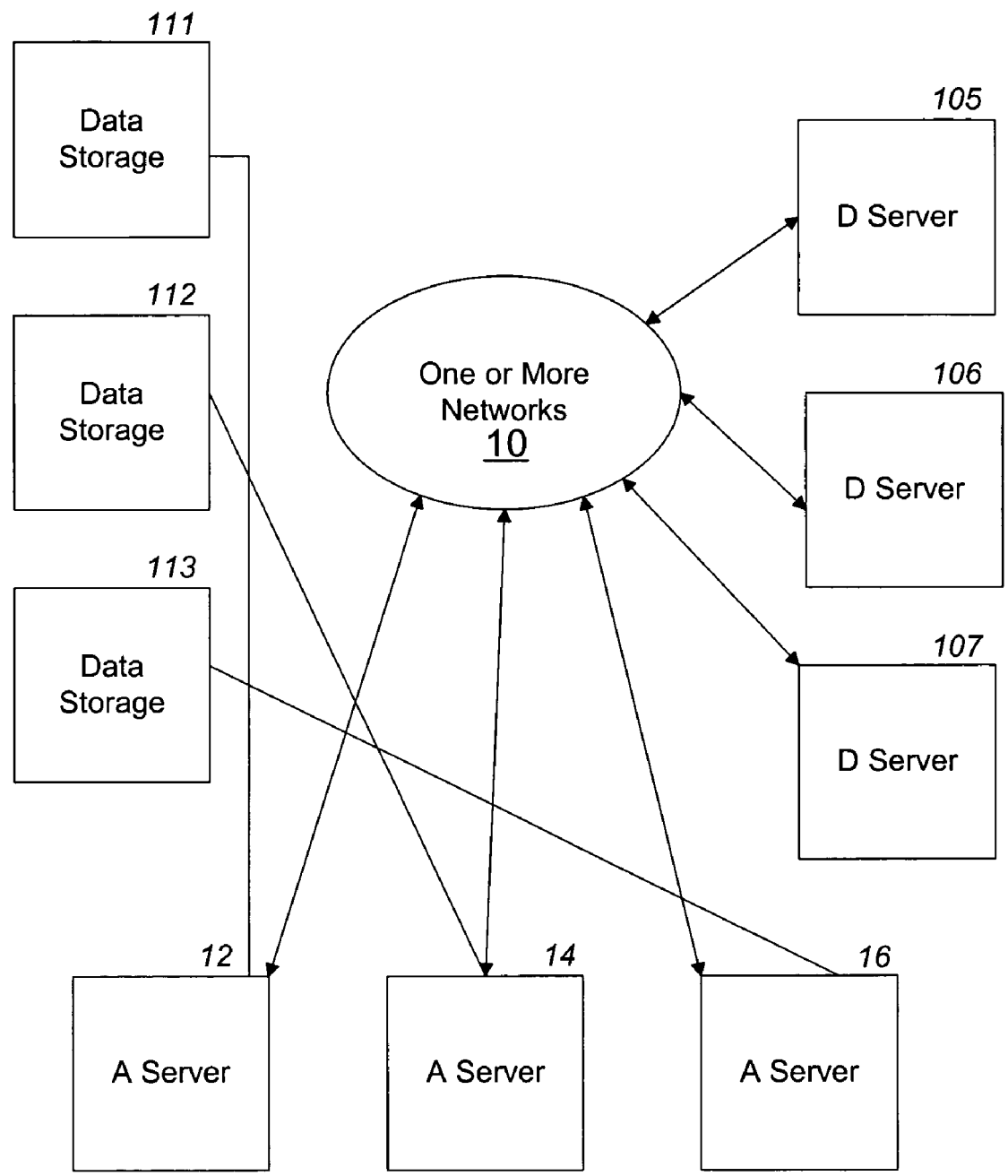
FIG. 6 is an illustration of storage systems in one embodiment.

FIG. 6 is an illustration of storage systems in one embodiment. Although this diagram depicts objects/processes as logically separate, such depiction is merely for illustrative purposes. It will be apparent to those skilled in the art that the objects/processes portrayed in this figure can be arbitrarily combined or divided into separate software, firmware and/or hardware components. Furthermore, it will also be apparent to those skilled in the art that such objects/processes, regardless of how they are combined or divided, can execute on the same computing device or can be distributed among different computing devices connected by one or more networks.

Each of the A servers can communicate with one or more storage servers 111, 112, 113 or other memory/storage (local and/or remote) that can maintain email distribution lists. Because the email distribution lists can be located on one or more separate servers, there is a further reduction in the drain on the system resources of the A servers. In such an embodiment, the A servers may be dedicated to controlling email distribution. Other tasks relating to updating of the database information such as, for example, additions and deletions to the mailing lists may be handled by yet another computer with access to the storage servers. This same alternate architecture for improved efficiency and distribution of resources may be applied to the other servers previously described herein. In particular, information which is utilized by or otherwise manipulated by the remaining servers may also be persisted in the one or more storage servers in order to further decrease the drain on the resources of the particular server.

An example of the increased efficiency achieved by utilization of separate storage server(s) for storage of the email distribution lists is that the A servers would not be required to interact with the D servers or any other server in order to insure that requested additions and/or deletions from the lists would be made. In such an embodiment, the D servers could periodically transmit buffered changes in the email distribution list to the appropriate storage server. In another embodiment, one or more storage servers having responsibility for persisting the email distribution list could periodically request this change information directly from the appropriate D server(s), or from another memory associated with the inbound D server(s). The utilization of these additional memories or servers further improves the efficiency and capacity of the overall system.

In another embodiment, one or more of the A, B, C and D servers can utilize one or more storage servers. This alternate system architecture further increases the flexibility and efficiency of the system. Thus, updates to the email distribution list could be made directly by either the C or D server(s). Alternatively, the storage server or memory housing the relevant list information can be programmed to periodically request information from C and/or D server(s).

In yet anther embodiment, an email distribution list information persisted in one or more storage servers could be made available to users and/or processes for manipulation. Limited access to the servers housing the mailing list information could be provided through known secure communication links in order to prevent unauthorized access or compromise of lists. In a further embodiment, further efficiency and system improvement can be achieved through selective location of one or more of the servers or groups of servers. By way of a non-limiting example, efficiency of the system can be improved through the selective location of one or more B servers. The selective location of the B servers can be utilized in conjunction with selective email distribution list partitioning in order to take advantage of the network or geographic proximity of particular B server(s) responsible for email delivery. This arrangement can be utilized in order to further improve efficiency of the overall system.

By way of a non-limiting example, where it is known that a number of email distribution list members are located within a given network, for example, the AOL (America Online) network, the email distribution list could be partitioned once the delivery resources have been identified in order to take advantage of this known system characteristic. Specifically, where it is known that one of the B server(s) is located within this particular network i.e., the AOL network, then that portion of the list containing addresses for delivery within this network would be handled by the specific B server(s) could be located within the AOL network. In another embodiment, the system can be designed such that during the email distribution list partitioning process, those addresses which are within a common network can be located within a portion of the list dedicated to addressees of this common network.

In an alternate embodiment of the present invention, B servers can be physically located in disparate geographic regions of the country. For example, one B server would be located on the East Coast, another in the Southeast, a third in the Midwest, a fourth in Southern California and the fifth in Northern California. Although each of the server locations have been described as being a single server, it is contemplated that multiple servers can be present at each geographic location. The system would then operate as described above wherein large mailing lists can be partitioned for delivery by a plurality of B servers.

In one embodiment of the invention, the partitioning of the email distribution lists is done such that the overall system achieves further improvements in efficiency. This is accomplished by monitoring the number of network hops and/or the time delay from the B server responsible for delivering a particular message to the receive server to which a given recipient's email is directed. By way of a non-limiting example, a trace route and/or ping commands may be utilized to derive this information. A database can be maintained which contains information on the number of network hops and/or the time delay from the actual B server to the recipient server. Data can then archived relating to the number of hops and/or time delay required for delivery for each recipient on the list. In an embodiment, data is acquired in maintained regarding each recipient and the amount of time and/or network hops required for delivery by each of the B servers.

After several messages have been sent to each of the recipients from each of the B servers, it is possible to identify certain B servers which are preferred due to the fact that they are able to deliver a message in less time and/or with fewer network hops as compared to other B servers. In one embodiment, this may be a function of the relative geographic location of the B servers with respect to the recipient's mail server and/or the relative network positions of these servers.

For subsequent list partitioning, certain geographic locations of the B server for this particular recipient would either be designated as desirable or undesirable or acceptable/unacceptable. It will be recognized that these are categorizations only and the information may be generally utilized as a guide for identifying the preferred B server for particular recipient. As a result, for future deliveries of email messages, it is possible to selectively partition the email distribution list such that the overall system is able to take advantage of the distributed processing power of multiple B servers while also ensuring that the actual B server provides certain advantages over a randomly selected B server.

In an embodiment, the portion of the system which acquires the data relating to preferred B servers is only periodically performed so that delivery times remain unaffected but the data may nonetheless be accumulated. This can prevent a degradation in system performance at the expense of acquiring this information.

In yet another further embodiment of the present invention, once one or more of the B servers have indicated that they have available resources for processing of delivery requests, the B server(s) can be programmed to actively seek the subset(s) of the email distribution list for which they are responsible for. The A servers or primary program execution servers still initiate delivery and identify the B servers with resources available for execution of delivery. This embodiment differs in that the A servers are no longer responsible for partitioning of the email distribution lists and transfer of the subsets to the appropriate B servers. Rather, in this embodiment, when the B server has indicated that it has available resources, the B server then acquires one or more subsets of the list for delivery. This can be accomplished in a variety of different ways.

In one embodiment, when a B server indicates that it has available resources, the B server may automatically acquire one or more data files containing one or more distribution list subsets for delivery. The size of the subsets acquired by the B server may depend on its current relative load or some other system parameter. For example, this may be dependent upon the relative resources available for this particular server and those available resources from other B servers. As noted above, the B server may request distribution list subsets from the A servers or alternatively, the B servers may request the distribution list subset data from additional servers or memory associated with the system. Once this data is acquired, delivery can continue as described above. In such an embodiment, the A server may be utilized to ensure that all subsets of the distribution list have been delivered or have delivery resources assigned for delivery.

For example, if there are 200,000 recipients for a given email distribution list, B servers having equal available resources or processes, then the mailing for delivery responsibilities will be substantially equally distributed among the available machines, approximately 40,000 recipients to be processed by each B server. It should be recognized that the assignment of delivery responsibilities to available resources or processes does not need to be identically balanced or equal. For example, in the embodiment of the system where B servers take an active role in acquiring one or more subsets of the distribution list, the amount of the list or the number of distribution list subsets acquired by a particular B server may be set to a predetermined value based upon its availability of resources or processes. By way of a non-limiting example, at one level of availability it will seek out one distribution list subset having 10,000 recipients. If additional resources are available at the server then it will actively request another subset of the list. The system is programmed such that each B server with available resources or processes will acquire one or more subsets of the list such that the number or size of the subsets of the mailing list acquired by the particular B server correlates with the amount of resources available at the particular server.

In one embodiment, each server that sends email (e.g., B server or other server/process) can be provided with a message delivery rate performance governor. The governor can execute locally on its server or on another computing device. The governor can increase or decrease the delivery rate of email messages for a server depending on the server's operating conditions. By way of a non-limiting example, these conditions can include DNS lookup resolution times, the number of Internet hops between the server and the email destination, the performance of intermediate hops and/or the destination system, the number of retries required to deliver a message, demands on computing resources, and other local or remote factors. In another embodiment, a single governor process can control more than one server.

In one embodiment, the governor can monitor email delivery performance over time and increase or decrease server resources available for reservation by A server(s) in order to cause the email sender server's delivery performance to attain a target delivery rate. One feature of this embodiment is that the performance governor does not need to communicate with other machines in order to accomplish this. The governor utilizes feedback in the form of its server's email delivery efficiency. Based on this information and a target delivery rate, maximum available resources are either increased or decreased periodically or continuously. In one embodiment, resources are adjusted in accordance to the equations in Table 2 below.

TABLE 1

Exemplary Performance Governor Parameters in an Embodiment

| PARAMETER | DEFAULT VALUE |
|---|---|
| TARGET_DELIVERY_RATE | 140K messages/hour |
| AVAIL_PROCS_DAMPING_FACTOR | 24 processes/Day |
| Sample Interval (S) | 3 hours |
| DONT_USE_DYNAMIC_DAMPING | FALSE |

In one embodiment and by way of example, the message delivery rate of a email server is the number of email messages that the server successfully delivers over time. While performance data can be gathered continuously, the governor in one embodiment can make period adjustments to its server at each interval S (see Table 1). In one embodiment, interval S is a constant equal to three hours and TARGET_DELIVERY_RATE is a constant equal to 140,000 messages per hour. When the message delivery rate is below TARGET_DELIVERY_RATE (see Table 1), additional MTAs are made available for reservation by A servers. Likewise, if the delivery rate is above the TARGET_DELIVERY_RATE, fewer MTAs are made available.

TABLE 2

Exemplary Governor Equations in an Embodiment

| EQUATION | DEFINITION |
|---|---|
| Interval Throughput | $M_s = \dfrac{\text{Messages Delivered}}{S}$ |
| Interval Allocated Processes | $P_a = \dfrac{\text{Average number of allocated MTA procs}}{S}$ |

TABLE 2-continued

Exemplary Governor Equations in an Embodiment

| EQUATION | DEFINITION |
| --- | --- |
| Interval Efficiency | $E_a = \dfrac{M_s}{P_a}$ |
| Interval Utilization | $U_s = \dfrac{P_a}{Csdam_{-1}}$ or $U_s = \dfrac{P_a}{Csdyn_{-1}}$ |
| New Available Processes (damped) | $Csdam = \min\left(Csdam_{-1} + d,\ \max\left(Csdam_{-1} - d,\ \dfrac{TARGET\_DELIVERY\_RATE}{E_a}\right)\right)$ |
| New Available Processes (dynamic) | $Csdyn = \min\left(Csdyn_{-1} + d*U_s,\ \max\left(Csdam_{-1} - d*U_s,\ \dfrac{TARGET\_DELIVERY\_RATE}{E_a}\right)\right)$ |

In one embodiment and by way of example, interval throughput $M_s$ is the number of email messages successfully delivered during the time interval S (see Table 1). Interval allocated processes $P_a$ is the average number of allocated MTAs allocated by A server(s) during the interval S. Interval efficiency $E_a$ provides an indication of how efficiently a B server is delivering email messages and is defined as interval throughput $M_s$ over interval allocated processes $P_a$.

In one embodiment, the governor can periodically or continuously determine how many MTAs to make available for A server(s) to reserve according to the Csdam formula (see Table 2). In one embodiment, this can occur if DONT_USE_DYNAMIC_DAMPING is equal to TRUE. This formula determines available processes based on a damping approach. Damping can help avoid performance swings by controlling the amount by which Csdam can change. $Csdam_{-1}$ is the number of available MTAs determined in the previous interval S. The maximum number by which Csdam can be increased or decreased in an interval S is given by a constant d. In one embodiment and by way of example, if d is equal to eight processes and S is equal to three hours, then the most Csdam can vary in a 24 hour period is 24 processes. In one embodiment, $$d = \frac{AVAIL\_PROCS\_DAMPING\_FACTOR}{S},$$

where AVAIL_PROCS_DAMPING_FACTOR is the maximum allowed change in available MTAs per day.

By way of a non-limiting example, an A server may contact a B or other server to determine how many MTAs it has available for reservation. Assuming Csdam=200, and out of those 200 process 186 are already allocated, then there are 14 available for reservation by the A server. One interval later, Csdam is equal to 197. Assuming no allocated processes have become free/available, then there would be only 11 MTAs available for reservation by A server(s).

In another embodiment, a dynamic damping approach to determining available processes can be employed if DONT_USE_DYNAMIC_DAMPING is FALSE. Dynamic damping can help adjust for the trailing effect of performance swings. This is based on the notion that if an email server is not fully utilized, then Csdam may not be dependable since performance generally does not scale linearly. By way of a non-limiting example, if a server is only 50% utilized, then the amount by which we can change the number of available processes could be scaled 50% to reflect this. This idea is expressed in the Csdyn formula (see Table 2) which is similar to Csdam with the exception that d is scaled by utilization $U_s$. Utilization in one embodiment is defined as interval allocated processes over $Csdyn_{-1}$.

In one embodiment, the governor does not free MTAs that have already been allocated by A servers, even if Csdam or Csdyn falls below the number of MTAs allocated. In another embodiment, the number of allocated MTAs can be brought in line with Csdam or Csdyn to reduce the lag time in response characteristics. This can be done at each interval S or on a continuous basis. In one embodiment, MTAs can be selected to be freed (i.e., made available for reservation) based on whether or not the process is ahead of its delivery schedule. In yet another embodiment, MTAs can be chosen based on a priority. In another embodiment, MTAs can be chosen based on their level of job completion. In another embodiment, rather than freeing MTAs, the email distribution list subset assigned to an MTA process can be reduced in length such that the process completes execution early. It will be appreciated that many other schemas are possible and within the scope and spirit of the present disclosure.

When message delivery fails for a given recipient, an MTA can resend the message to the recipient. The number of times an MTA will resend a message before giving up is the retry limit. The retry limit is a dynamically configurable operating parameter for MTAs. Delivery failure rate (DFR) is the number of delivery attempts over the number of successful deliveries:

$$DFR = \frac{delivery\ attempts}{successful\ deliveries}.$$

DFR can affect the performance governor's ability to regulate performance. As DFR increases, delivery performance can degrade. In one embodiment, the performance governor can control the retry limit dynamically such that DFR is reduced. By reducing resources spent on recipients for which message delivery attempts have failed, more resources are potentially available for use in delivering messages to other recipients that have a higher probability of success.

In one embodiment, if the number of allocated MTAs exceeds a first limit (e.g., Csdam, Csdyn, or some other limit), the retry limit can be reduced (e.g., from ten to five). When the number of allocated MTAs falls below a second limit (e.g., 80% of the first limit), the retry limit can be increased (e.g., from five to ten). The retry limit can be adjusted continuously or periodically.

In another embodiment, if the DFR for an MTA, a server and/or a cluster of servers exceeds a first value (e.g., seven), the retry limit can be reduced (e.g., from ten to five). When the DFR falls below a second value (e.g., four), the retry limit can be increased (e.g., from five to ten). Alternatively, the retry limit can be adjusted continuously or periodically as a function of the DFR.

In another embodiment, the retry limit can be adjusted based on both the number of allocated MTAs and the DFR. By way of a first non-limiting example, if the number of allocated MTAs is below a first limit, the retry limit can be adjusted based on the DFR. If the number of allocated MTAs is above the first limit, the retry limit can be adjusted based on the number of allocated MTAs. By way of a second non-limiting example, the retry limit can be adjusted as a function of the number of allocated MTAs and the DFR. The value set of such a function can be based on empirical performance data or an algorithm. It will be apparent to those of skill in the art that many other possibilities exist and are within the scope and spirit of the present disclosure.

In another embodiment, the retry limit can be adjusted based on the stage of message delivery. By way of a non-limiting example, in the early stages of message delivery (when resources are more abundant), the retry limit can be set to a high value. During the later stages of message delivery (when resources are less abundant), the retry limit can be set to a lower value. Other embodiments are possible, such as continuously adjusting the retry limit as a function of the number of recipients remaining who have not yet received the message. It will be apparent to those of skill in the art that many other possibilities exist and are within the scope and spirit of the present disclosure.

In another embodiment, the retry limit can be adjusted as a function of utilization $U_s$. By way of a non-limiting example, as $U_s$ increases, the retry limit can be decreased and vice versa. By way of a second non-limiting example, if $U_s$ exceeds a first limit, the retry limit can be reduced (e.g., if $U_s$ is over 100%, the retry limit can be reduced from ten to five). If $U_s$ falls below a second limit (e.g., 80%), the retry limit can be increased (e.g., from five to ten). It will be apparent to those of skill in the art that many other possibilities exist and are within the scope and spirit of the present disclosure.

In the version of the system where the B servers are responsible for acquiring one or more distribution list subsets for delivery, A servers can maintain the responsibility of ensuring that each of the B servers charged with delivery responsibilities actually completes delivery of the subset(s). This ensures that even when a B server hangs during processing, delivery will be completed. If the B server fails during delivery, the A server ensures that delivery of a complete list is accomplished.

In a further refined embodiment of the system, the A server or other server or memory within which one or more primary mailing lists are stored is automatically updated with information from both bounced messages acquired by the C servers and stored therein or in another memory associated with the C servers as well as information relating to inbound requests for additions and or deletions from the lists acquired by the D servers and stored therein or in another memory associated with the server. This can be accomplished by a computer program which periodically requests this information or can access a memory within which this data may be contained. The program then can access the database containing the list for which a change is to be made. Thereafter the computer program interacts with the database in order to make the appropriate additions and/or deletions from the list. For bounced message processing, the system may be configured in order to delete messages which have bounced a single time or more than one time. Specifically, for example it may be desirable to delete bounced messages only after they have bounced more than one time in order to ensure that desired recipients are not inadvertently deleted.

Figure 7:
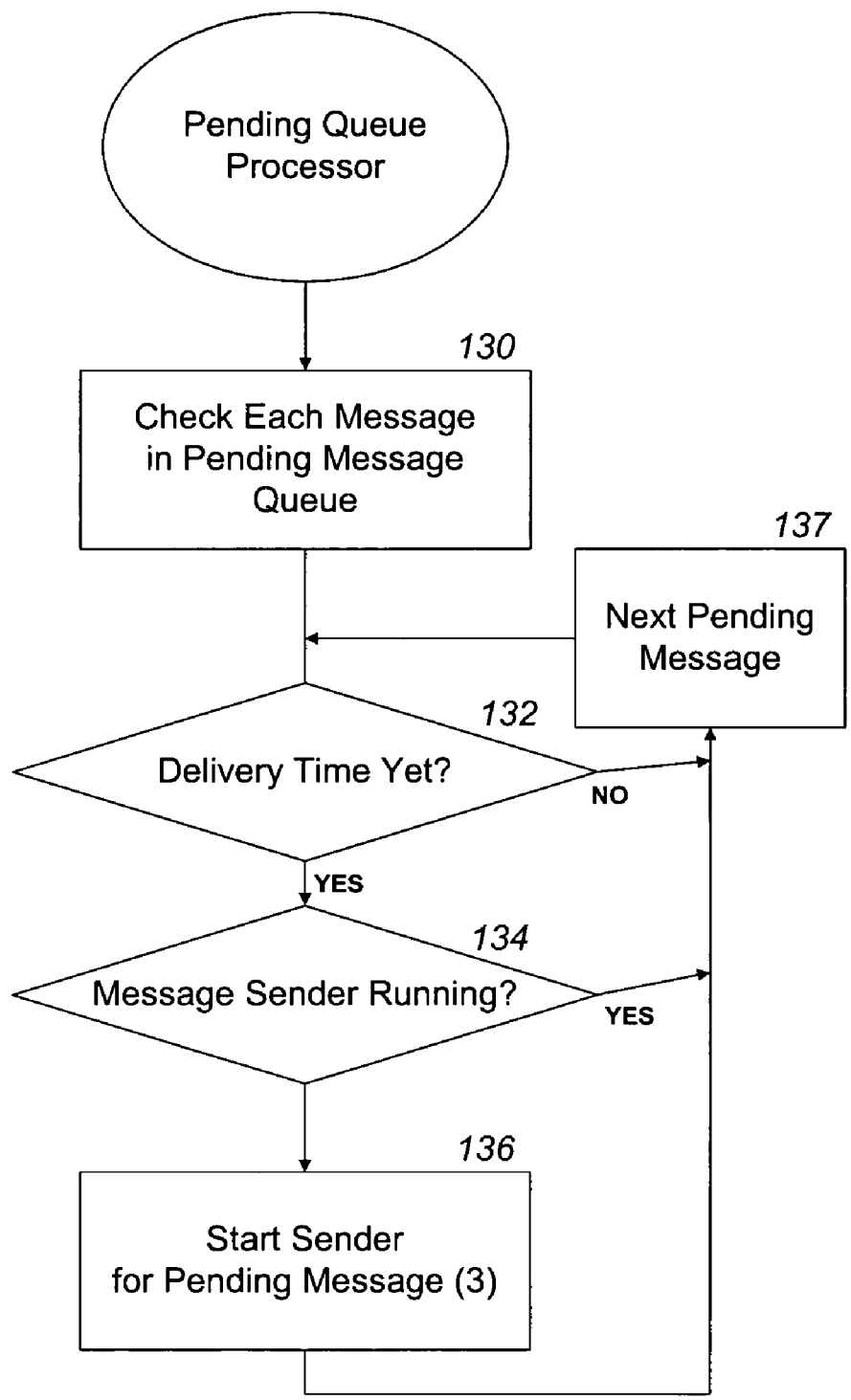
FIG. 7 is a flow diagram illustration a message queue monitor process in an embodiment of the present invention.

FIG. 7 is a flow diagram illustration a message queue monitor process in an embodiment of the present invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

In step 130, the system checks each email message in the pending message queue to verify whether or not its delivery time has expired. In step 132 if the delivery time has not expired the system can review the delivery time of the next email message in the queue. If the delivery time has expired, the system can verify whether the message sender process is running for that particular message in step 134. If the message sender process is already running then the system can review the next email message in the pending message queue. If the message sender is not running for a particular email message for which delivery time has expired the system then starts a sender process in step 136. Step 137 simply illustrates skipping to the next message in the pending message queue.

Figure 8A:
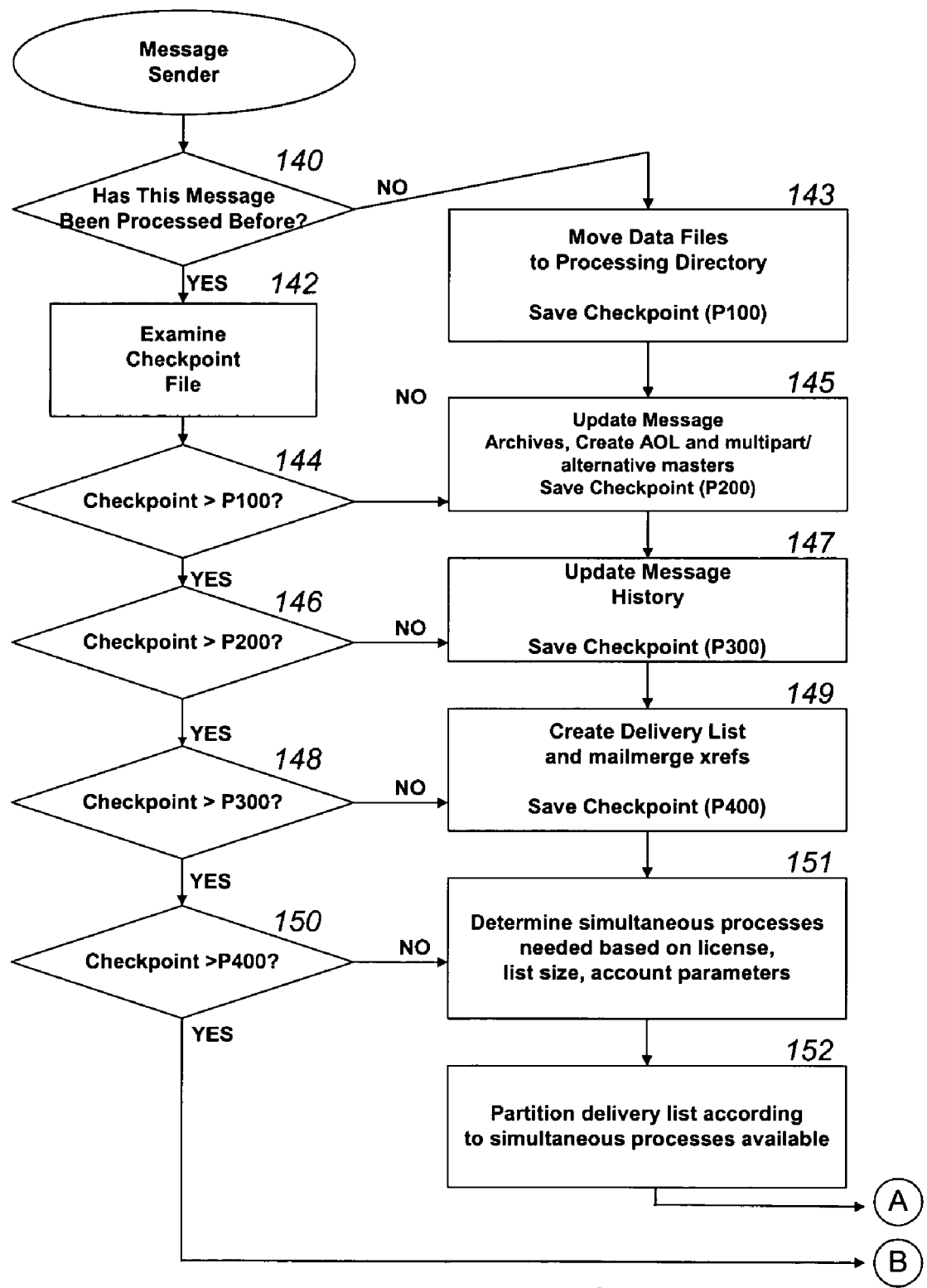
FIG. 8A is a flow diagram illustration of a portion of the sender process in an embodiment.

FIG. 8A is a flow diagram illustration of a portion of the sender process in an embodiment. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

In step 140 the system can determine whether the system has previously processed the email message. If the message has been previously processed, in step 142 the system can review the checkpoint file. In step 143 if the message has not been processed before, the system can move data files to a processing directory and save a checkpoint as P100. In steps 144, 146, 148, 150 the system can verify the current checkpoint value. In step 145, the system can update message archives, create AOL and multipart/alternative masters and save checkpoint P200. In step 147, the system can update an email message history and save checkpoint P300. In step 149, the system can create email distribution list(s) and mail merge cross references and can save checkpoint P400. In step 151, the system can determine the number of simultaneous MTAs needed based on license, list size and account parameters. In step 152 the system can produce email distribution list subsets according to simultaneous processes or delivery resources available to the system. In one embodiment, this can based on the availability of MTAs on one or more B servers.

Figure 8B:
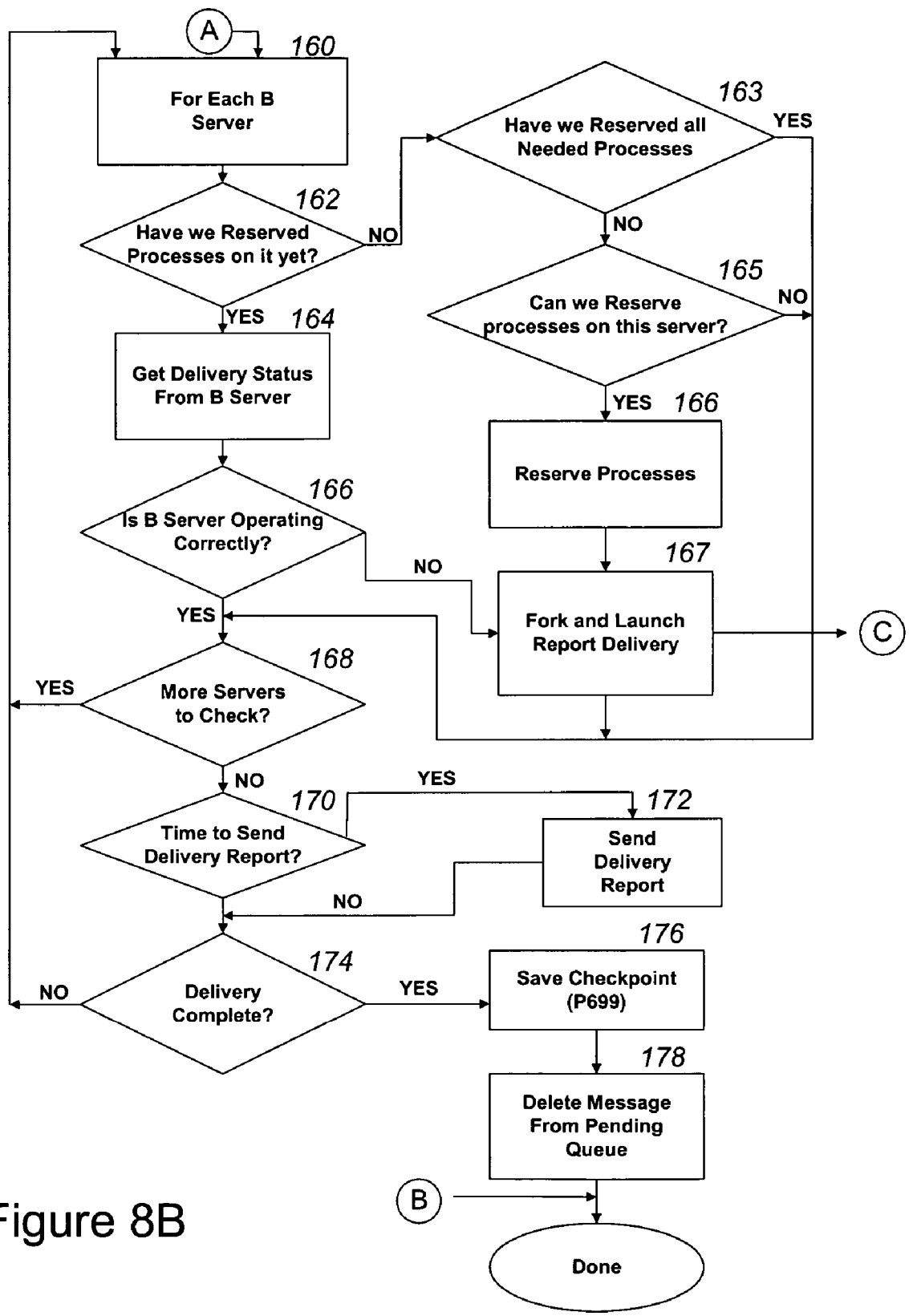
FIG. 8B is a flow diagram illustration of another portion of the sender process in an embodiment.

FIG. 8B is a flow diagram illustration another portion of the sender process in an embodiment. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Block 160 indicates that the subsequent steps are performed for each available B server. In step 162 the system can determine whether or not the system has allocated MTAs on this particular server previously. In step 164 the system can determine the delivery status from the B server. In step 166 the system can determine whether the B server is operating correctly. If so, then the system can determine whether more servers need to be checked in step 168. In step 170 the system can determine whether send a delivery report. If so, then in step 172 the system sends the required report. In step 174 the system can determine whether delivery is complete. If not, the system can determine whether the B server has aborted delivery. If delivery is complete the system then saves checkpoint as P699 in step 176. In step 178 the system can delete the message from the pending message queue.

Steps 163, 165, 166 and 167 are directed to reserving processes on B servers. In step 163 the system determines whether all necessary processes have been allocated. If all processes have not been allocated, then in step 165 the system determines whether processes can be allocated on this server. If processes can be allocated then the system reserves processes in step 166. Thereafter, in step 167 the system creates a forked process and launches remote delivery.

Figure 8C:
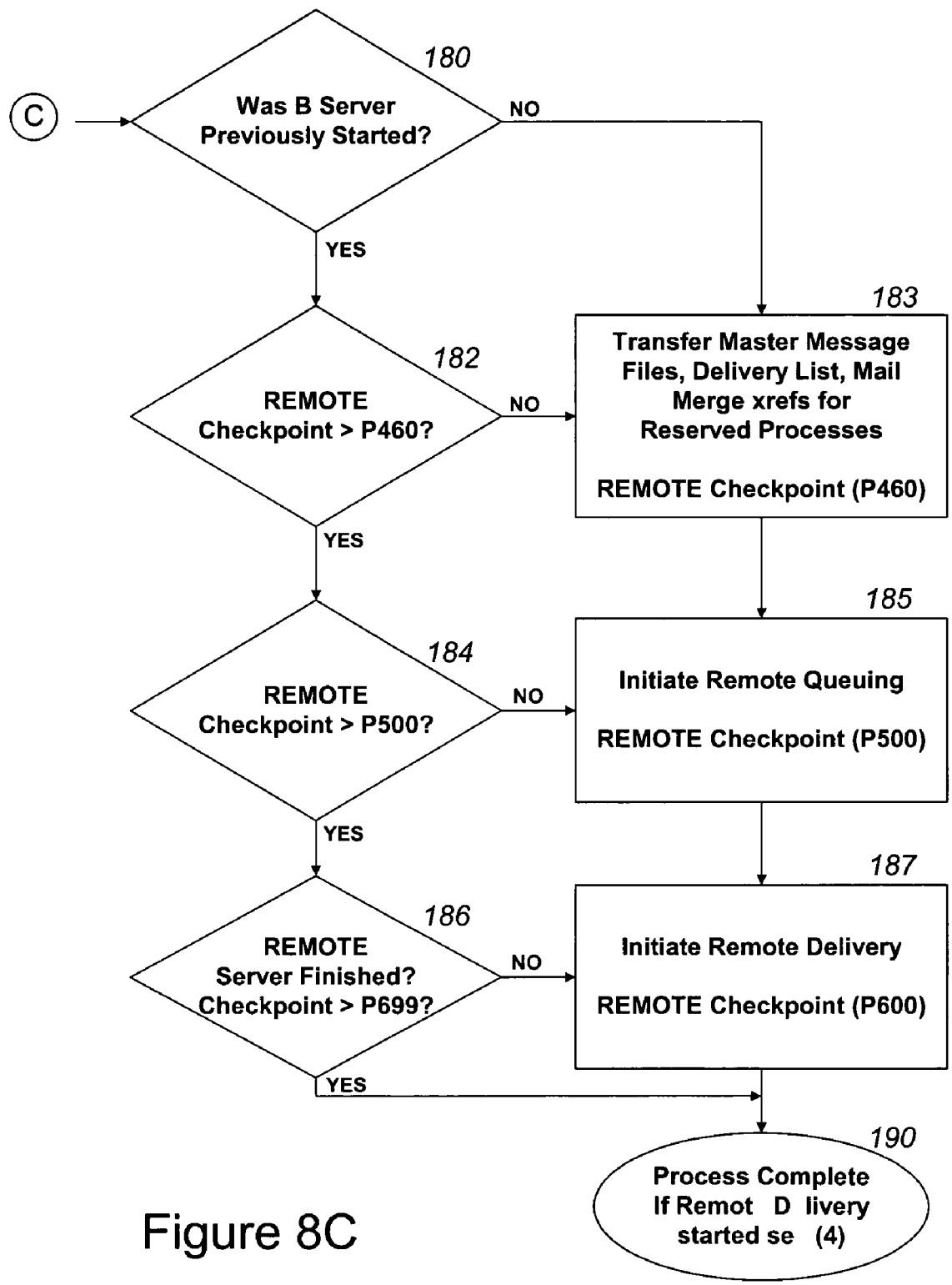
FIG. 8C is a flow diagram illustration of another portion of the sender process an embodiment.

FIG. 8C is a flow diagram illustration of another portion of the sender process in an embodiment. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

In step 180 the system determines whether a particular B server was previously started. If so, in step 182 the system verifies whether a remote checkpoint is greater than P460. Remaining steps 184 and 186 also relate to verification of the current remote checkpoint value. As shown in step 186, if checkpoint is 699, then the process is complete as shown in subsequent step 190. In step 183 the system transfers master message files distribution lists, mail merge and cross references for allocated processes. Remote checkpoint is set to P460. In step 185 the system initiates remote queuing and sets remote checkpoint to P500. In step 187, system initiates remote delivery and sets checkpoint to P600.

Figure 9:
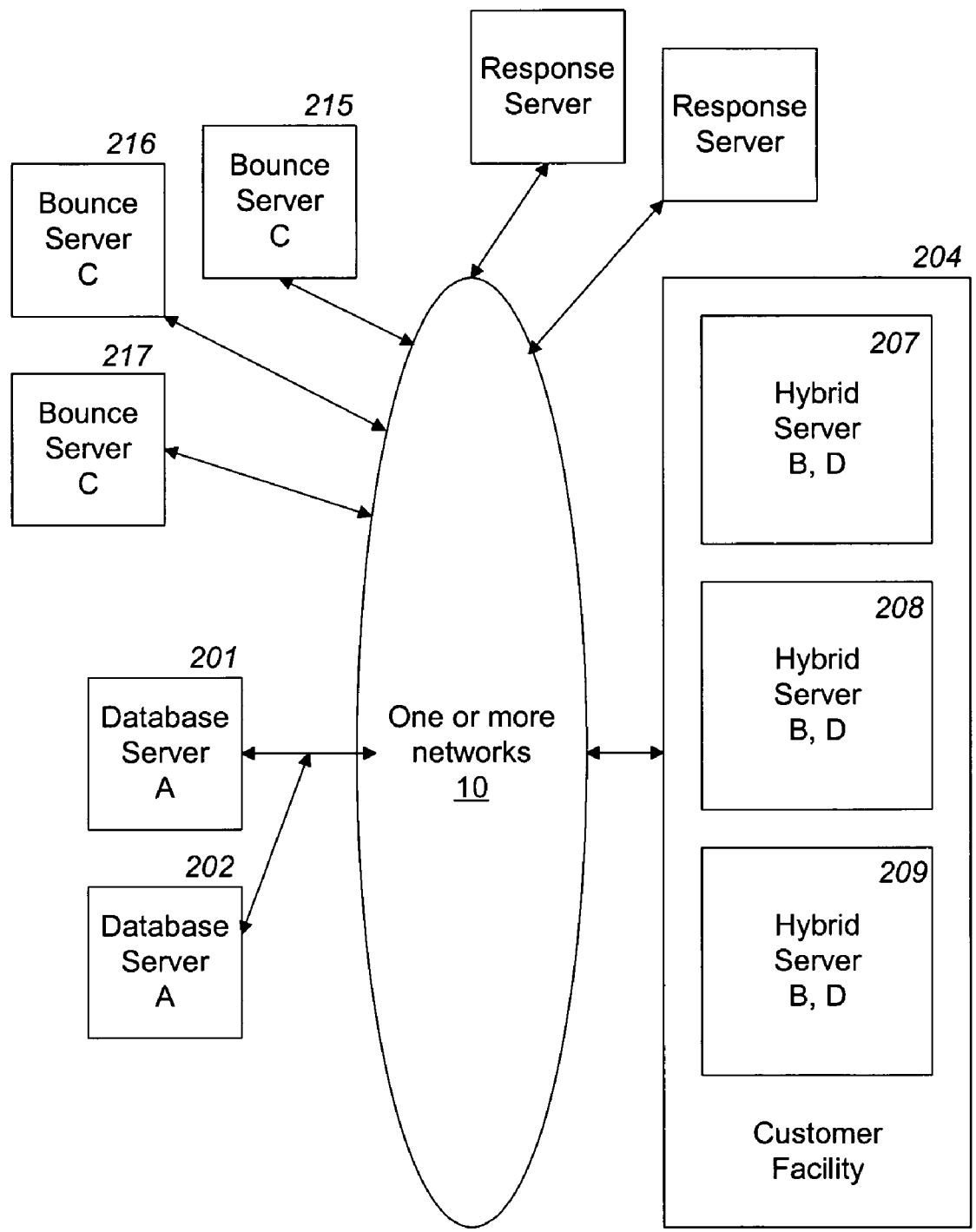
FIG. 9 illustrates hybrid servers that incorporate functionality for sending messages and processing requests in an embodiment.

FIG. 9 illustrates hybrid servers that incorporate functionality for sending messages and processing requests in an embodiment. Although this diagram depicts objects/processes as logically separate, such depiction is merely for illustrative purposes. It will be apparent to those skilled in the art that the objects/processes portrayed in this figure can be arbitrarily combined or divided into separate software, firmware and/or hardware components. Furthermore, it will also be apparent to those skilled in the art that such objects/processes, regardless of how they are combined or divided, can execute on the same computing device or can be distributed among different computing devices connected by one or more networks.

In accordance with this alternate an embodiment, the system can employ one or more hybrid servers which include the capability of the B and D servers and are designated in 207, 208 and 209. These hybrid servers can accept and forward bounced mail to the C severs 215, 216 and 217. Additionally, they can act as HTTP proxy servers for response servers and they can forward HTTP requests and responses. Response processing that is handled by these servers include, for example, those tasks as described in co-pending application Ser. No. 10/171,720, titled Systems And Methods For Monitoring Events Associated With Transmitted Email Messages, filed on Jun. 14, 2002, which is incorporated herein by reference in its entirety.

The email forwarding mechanism used by a hybrid server may be one of many available standard email software programs, provided it can be configured to ensure that any mail delivered to recipients (as opposed to system servers) is stripped of information identifying the email delivery service, and instead includes only the hybrid server as the origin of the mail. The HTTP proxy used also may be one of many available standard HTTP web or proxy servers, again configured in such a way as to identify the hybrid server as the destination and origination of HTTP requests and responses respectively. Such configurations are relatively common. In one embodiment, the hybrid servers can be physically located at a customer facility 204 or are otherwise separated from the remaining system operations and can be under the direct control and responsibility of a customer desiring to send substantial numbers of email messages.

The remaining servers used in performing the overall delivery system operations can be located at some other distant location and can remain under the custody and control of the email delivery service.

In another embodiment and with reference to FIG. 9, one or more database servers 201 and 202 can be under control of a email delivery service and can be physically separated from a customer site or third party facility 204 at which the hybrid servers may be located. Similarly, the C servers and response servers also can be under the control of the email delivery service and can be physically separated from the actual customer location. In this an embodiment, the mail delivery service can maintain custody and control of the servers other than the hybrid servers, while the customer can maintain custody and control of the hybrid servers.

In order to eliminate ISP issues for mass email delivery service providers, any functionality to which a customer's recipients will be exposed can be located within the customer's network or on a network which is otherwise associated with the mail delivery customer. For example, this functionality i.e., response servers, as well as inbound or bounce servers should be either located on a hybrid server at the customer's location or the hybrid servers at the customer's location will be used as a proxy/or forwarding interface in order to remove any association with the email service provider.

Alternatively, a third party may maintain custody and control of the hybrid servers, and provide for the servers' internet connectivity. In this alternative embodiment, such a third party takes responsibility for the aforementioned issues associated with the hybrid servers.

Figure 10:
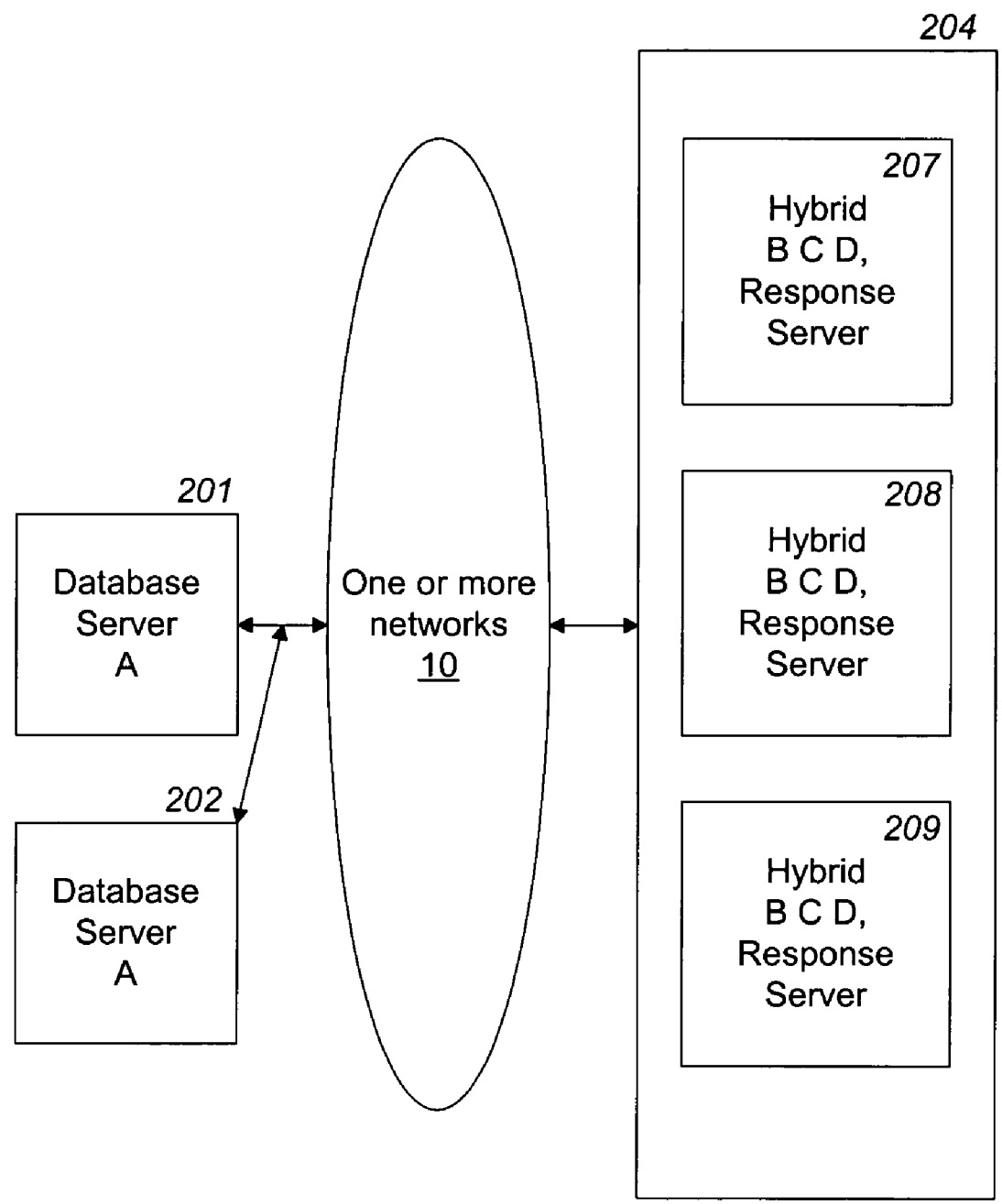
FIG. 10 illustrates hybrid servers that incorporate the functionality for sending messages, processing requests, and processing returned messages in an embodiment.

FIG. 10 illustrates hybrid servers that incorporate the functionality for sending messages, processing requests, and processing returned messages in an embodiment. Although this diagram depicts objects/processes as logically separate, such depiction is merely for illustrative purposes. It will be apparent to those skilled in the art that the objects/processes portrayed in this figure can be arbitrarily combined or divided into separate software, firmware and/or hardware components. Furthermore, it will also be apparent to those skilled in the art that such objects/processes, regardless of how they are combined or divided, can execute on the same computing device or can be distributed among different computing devices connected by one or more networks.

In one embodiment, a customer facility can include one or more hybrid servers 207, 208 and 209. The hybrid servers are each independently capable of performing mail delivery, processing of inbound mail, processing bounced mail, and response processing. Unlike the embodiment of FIG. 9, these severs need not forward bounced mail to additional servers because they handle the internal processing of these messages. Likewise, these hybrid servers include the ability to process responses, and therefore do not require HTTP proxy capability for response traffic.

Figure 11:
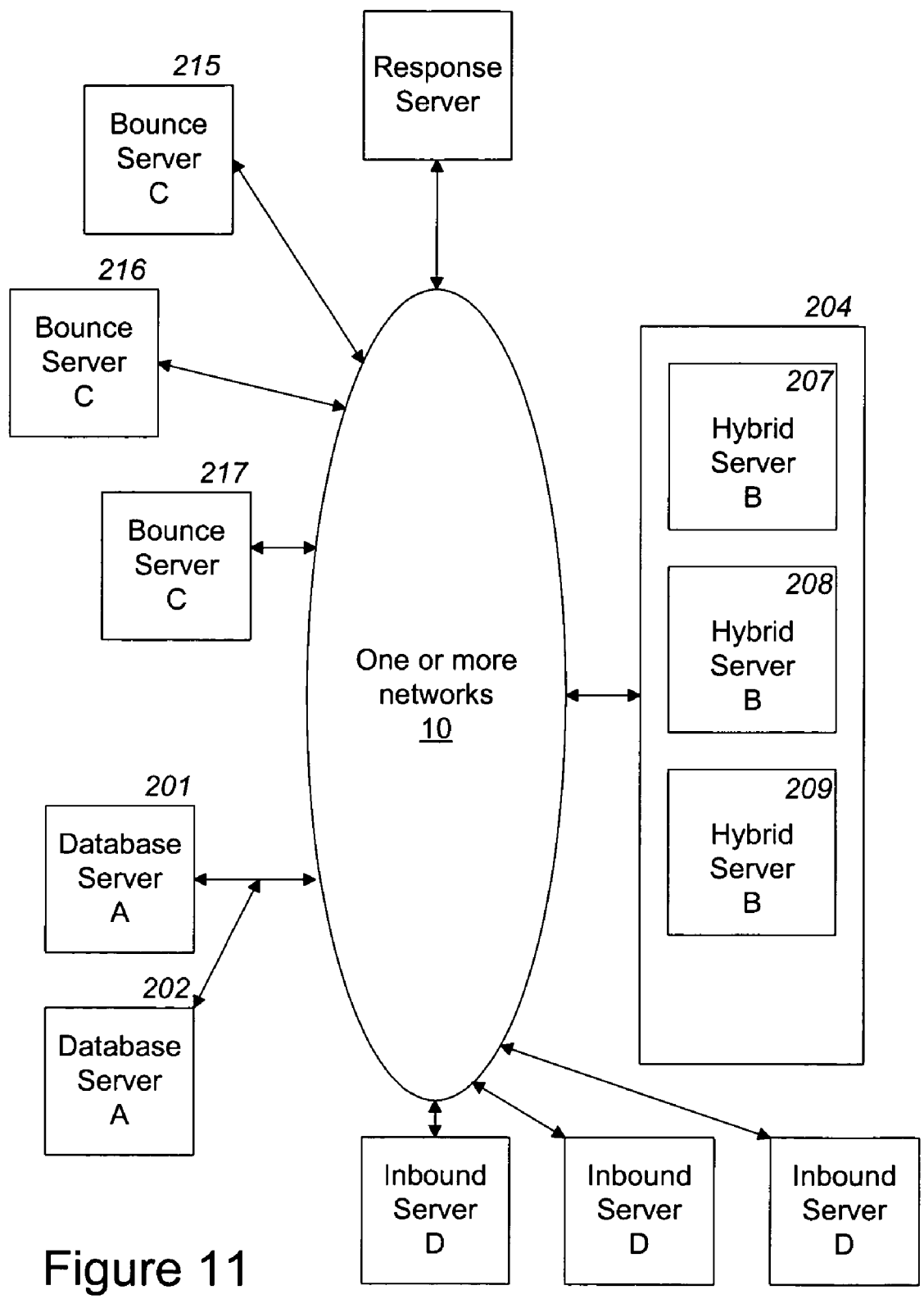
FIG. 11 illustrates an alternate embodiment of the present invention.

FIG. 11 illustrates an alternate embodiment of the present invention. Although this diagram depicts objects/processes as logically separate, such depiction is merely for illustrative purposes. It will be apparent to those skilled in the art that the objects/processes portrayed in this figure can be arbitrarily combined or divided into separate software, firmware and/or hardware components. Furthermore, it will also be apparent to those skilled in the art that such objects/processes, regardless of how they are combined or divided, can execute on the same computing device or can be distributed among different computing devices connected by one or more networks.

In one embodiment, a customer facility maintains one or more hybrid servers 207, 208 and 209. The hybrid servers are only responsible for performing mail delivery operations and acting as a proxy or forwarding interface for other banks of servers. These hybrid servers can forward any bounced mail to one or more C servers 215, 216, 217. Additionally, the hybrid servers can forward any inbound mail and act as HTTP proxies for the D servers 220, 221, 222. Furthermore, the hybrid servers can act as HTTP proxies for the response servers. In this embodiment, the database servers 201 and 202 are also distinct servers which remain under the control of the email delivery service.

In one embodiment, a greater or lesser number of checkpoints may be utilized by the system in order to verify completion of and/or restart of various stages in the overall process. It will also be appreciated by those skilled in the art that numerous modifications and alterations of the systems and methods set forth herein are contemplated but will nevertheless fall within the spirit and scope of the present invention as defined in the attached claims.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of ans of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

We claim:

1. A method for governing the delivery rate of electronic mail (email) messages, said method comprising:
   identifying one or more email messages to be delivered to a plurality of recipients;
   maintaining a plurality of mail transfer agents (MTAs) that are capable of delivering the email messages simultaneously;
   initiating delivery of the email messages to the plurality of recipients by allocating the email messages among the plurality of MTAs;
   monitoring delivery efficiency of said email messages based on the performance of the plurality of MTAs during delivery of the email messages;
   determining a target delivery rate for said email messages; and
   controlling the rate of the email delivery based on the delivery efficiency and the target delivery rate of said MTAs by increasing a number of MTAs that are allocated for delivering the email messages when the delivery efficiency of the email messages is below the target delivery rate and decreasing the number of MTAs that are allocated for delivering the email messages when the delivery efficiency is above the target delivery rate.

2. The method of claim 1 wherein:
   the delivery efficiency includes a message delivery rate of the email messages that each MTA delivers over a period of time.

3. The method of claim 1 wherein:
   said controlling the rate of the email delivery is accomplished by de-allocating MTAs in the plurality of MTAs that are in use.

4. The method of claim 1, wherein:
   said controlling rate of the email delivery based on MTA utilization.

5. The method of claim 1 wherein:
   the delivery efficiency is based on email message throughput over a period of time and the average number of allocated MTAs in the plurality of MTAs over the period of time.

6. The method of claim 1 wherein:
   said controlling the rate of the email delivery is continuous or periodic.

7. The method of claim 1 wherein:
   the plurality of MTAs execute on one or more servers.

8. The method of claim 1 wherein:
   an MTA is restarted if it fails.

9. The method of claim 1 wherein:
   an MTA personalizes an email message.

10. The method of claim 1, further comprising:
   adjusting an MTA email message delivery retry limit based on one of: 1) a number of allocated MTAs; 2) delivery failure rate; 3) a number of allocated MTAs and a delivery failure rate; 4) stage of message delivery; and 5) utilization of the plurality of MTAs.

11. A method for governing the delivery rate of electronic mail (email) messages, said method comprising:
   identifying one or more email messages to be delivered to a plurality of recipients;

maintaining a plurality of mail transfer agents (MTAs) that are capable of delivering the email messages simultaneously;

initiating delivery of the email messages to the plurality of recipients by allocating the email messages among the plurality of MTAs;

continuously tracking over time delivery efficiency for the plurality of MTAs during delivery of the email messages;

determining a target delivery rate for said email messages; and periodically adjusting the rate of the email delivery based on the delivery efficiency and the target delivery rate of said MTAs by increasing a number of MTAs that are allocated for delivering the email messages when the delivery efficiency of the email messages is below the target delivery rate and decreasing the number of MTAs that are allocated for delivering the email messages when the delivery efficiency is above the target delivery rate.

12. The method of claim 11 wherein:
said periodically adjusting the rate of the email delivery is accomplished by de-allocating MTAs in the plurality of MTAs that are in use.

13. The method of claim 11, wherein:
said periodically adjusting the rate of the email delivery is based on MTA utilization.

14. The method of claim 11 wherein:
the delivery efficiency is based on email message throughput over a period of time and the average number of allocated MTAs in the plurality of MTAs over the period of time.

15. The method of claim 11 wherein:
the delivery rate is periodically adjusted based on a time interval determined by a governing parameter.

16. The method of claim 11 wherein:
the plurality of MTAs execute on one or more servers.

17. The method of claim 11 wherein:
an MTA is restarted if it fails.

18. The method of claim 11 wherein:
an MTA personalizes an email message.

19. The method of claim 11, further comprising:
adjusting an MTA email message delivery retry limit based on one of: 1) a number of allocated MTAs; 2) delivery failure rate; 3) a number of allocated MTAs and a delivery failure rate; 4) stage of message delivery; and 5) utilization of the plurality of MTAs.

20. A method for governing the delivery rate of electronic mail (email) messages, said method comprising:
identifying one or more email messages to be delivered to a plurality of recipients;

maintaining a plurality of mail transfer agents (MTAs) that are capable of delivering the email messages simultaneously;

initiating delivery of the email messages to the plurality of recipients by allocating the email messages among the plurality of MTAs;

controlling the rate of the email delivery based on delivery efficiency and target delivery rate of said MTAs by increasing a number of MTAs that are allocated for delivering the email messages when the delivery efficiency of the email messages is below the target delivery rate and decreasing the number of MTAs that are allocated for delivering the email messages when the delivery efficiency is above the target delivery rate;

maintaining an email message retry limit;
detecting failure of the delivery to one or more of the plurality of recipients;
repeating delivery attempts based on the email message retry limit; and
automatically adjusting a email message retry limit for the plurality of MTAs to reduce delivery failure rate of said email messages by reducing resources spent on the recipients for which delivery attempts have failed.

21. The method of claim 20, wherein:
the delivery efficiency is based on the performance of the plurality of MTAs.

22. The method of claim 20 wherein:
said automatically adjusting the email message retry limit is based on one of: 1) a number of allocated MTAs; 2) delivery failure rate; 3) a number of allocated MTAs and a delivery failure rate; 4) stage of message delivery; and 5) utilization of the plurality of MTAs.

23. The method of claim 20 wherein:
the retry limit is reduced if a number of allocated MTAs in the plurality of MTAs exceeds a first value.

24. The method of claim 20 wherein:
the retry limit is increased if the number of allocated MTAs in the plurality of MTAs falls below a second value.

25. The method of claim 20 wherein:
the retry limit is decreased if an email delivery failure rate exceeds a first value.

26. The method of claim 20 wherein:
the retry limit is increased if an email delivery failure rate falls below a second value.

27. The method of claim 20 wherein:
the retry limit decreases as is later stages of message delivery.

28. The method of claim 20 wherein:
the retry limit is inversely proportionate to utilization of the plurality of MTAs.

29. A computer readable storage medium having instructions stored thereon, which instructions when executed by one or more processors cause a system to:
identify one or more email messages to be delivered to a plurality of recipients;

maintain a plurality of mail transfer agents (MTAs) that are capable of delivering the email messages simultaneously;

initiate delivery of the email messages to the plurality of recipients by allocating the email messages among the plurality of MTAs;

monitor delivery efficiency of said email messages based on the performance of the plurality of MTAs during delivery of the email messages;

determine a target delivery rate for said email messages; and control the rate of the email delivery based on the delivery efficiency and the target delivery rate of said MTAs by increasing a number of MTAs that are allocated for delivering the email messages when the delivery efficiency of the email messages is below the target delivery rate and decreasing the number of MTAs that are allocated for delivering the email messages when the delivery efficiency is above the target delivery rate.

30. The computer readable storage medium of claim 29 wherein:
the delivery efficiency includes a message delivery rate of the email messages that each MTA delivers over a period of time.

31. The computer readable storage medium of claim 29 wherein:

controlling the rate of the email delivery is accomplished by de-allocating MTAs in the plurality of MTAs that are in use.

32. The computer readable storage medium of claim 29 wherein:
said controlling the rate of the email delivery is based on MTA utilization.

33. The computer readable storage medium of claim 29 wherein:
the delivery efficiency is based on email message throughput over a period of time and the average number of allocated MTAs in the plurality of MTAs over the period of time.

34. The computer readable storage medium of claim 29 wherein:
said controlling the rate of the email delivery is continuous or periodic.

35. The computer readable storage medium of claim 29 wherein:
the plurality of MTAs execute on one or more servers.

36. The computer readable storage medium of claim 29 wherein:
an MTA is restarted if it fails.

37. The computer readable storage medium of claim 29 wherein:
an MTA personalizes an email message.

38. The computer readable storage medium of claim 29 further comprising instructions which cause the system to:
adjust an MTA email message delivery retry limit based on one of: 1) a number of allocated MTAs; 2) delivery failure rate; 3) a number of allocated MTAs and a delivery failure rate; 4) stage of message delivery; and 5) utilization of the plurality of MTAs.

* * * * *